(12) United States Patent
D'Amario (10) Patent No.: US 6,252,191 B1
(45) Date of Patent: Jun. 26, 2001

(54) METHOD AND APPARATUS FOR ELECTRICAL DISCHARGE MACHINING WITH INTERMITTENT ELECTRICAL MEASURING

(75) Inventor: Rino D'Amario, Taverne (CH)

(73) Assignee: Agie SA, Losone (CH)

( * ) Notice: Subject to any disclaimer, the term of this patent is extended or adjusted under 35 U.S.C. 154(b) by 0 days.

(21) Appl. No.: 09/206,026

(22) Filed: Dec. 4, 1998

(30) Foreign Application Priority Data

Dec. 4, 1997 (DE) ............................................. 197 53 812

(51) Int. Cl.[7] ................ B23H 3/02; B23H 7/04; B23H 7/20
(52) U.S. Cl. .................... 219/69.13; 219/69.12; 219/69.16; 219/69.17; 219/69.18
(58) Field of Search ................ 219/69.16, 69.17, 219/69.12, 69.18; 700/162

(56) References Cited

U.S. PATENT DOCUMENTS

| | | | |
|---|---|---|---|
| 3,988,560 | * 10/1976 | Losey et al. | 219/69.13 |
| 4,021,635 | * 5/1977 | Losey et al. | 219/69.16 |
| 4,236,057 | * 11/1980 | Inoue | 219/69.13 |
| 4,298,782 | 11/1981 | Wavre | 219/69.17 |
| 4,370,536 | * 1/1983 | Kruth | 219/69.17 |
| 4,376,880 | * 3/1983 | Inoue | 219/69.17 |
| 4,820,895 | * 4/1989 | Obara | 219/69.13 |
| 4,985,608 | * 1/1991 | Morishita et al. | 219/69.12 |
| 5,149,931 | * 9/1992 | Magara | 219/69.13 |
| 6,140,600 | * 10/2000 | Kaneko et al. | 219/69.12 |

FOREIGN PATENT DOCUMENTS

| | | |
|---|---|---|
| 650 433 A5 | 7/1985 | (CH) . |
| 2 250 872 | 3/1974 | (DE) . |
| 28 26 270 A1 | 9/1979 | (DE) . |
| 40 11 752 A1 | 10/1990 | (DE) . |
| 0 067 229 | 12/1982 | (EP) . |
| 2 427 167 | 12/1979 | (FR) . |
| 54-109698 | 8/1979 | (JP) . |
| 63-216631 | 9/1988 | (JP) . |
| 63-229227 | 9/1988 | (JP) . |
| 63-312020 | 12/1988 | (JP) . |
| 09248717 | 9/1997 | (JP) . |

OTHER PUBLICATIONS

International Search Report dated May 25, 1999, No. PCT/EP 98/ 07889.

Dierberger, "A New MOSFET Equipped 1kW RF Amplifier Pallet, for 13.56 MHz Applications, with a Galvanically Isolated and Power Factor Corrected 300VDC Bus," pp. 77–84, (May 1996).

German Patent Office official action dated Jul. 29, 1998 (with English translation).

* cited by examiner

*Primary Examiner*—Geoffrey S. Evans
(74) *Attorney, Agent, or Firm*—Marshall, O'Toole, Gerstein, Murray & Borun.

(57) ABSTRACT

EDM according to the present invention involves an intermttent type of operation between erosion pulses and measurement pulses in order to circumvent an interfering self-control effect of an electrode during fine machining. To achieve shorter processing times, higher precision and better reproducibility, the method and apparatus determine with an electrical measurement the amount that an electrode is in contact with a workpiece during a measurement time that erosion has been interrupted. A pulse duty factor is then obtained from the contact amount to control further processing via, for example, the duration of the erosion pulses.

38 Claims, 3 Drawing Sheets

METHOD AND APPARATUS FOR ELECTRICAL DISCHARGE MACHINING WITH INTERMITTENT ELECTRICAL MEASURING

FIELD OF THE INVENTION

The invention relates generally to electrical discharge fine-machining (EDM), and, more particularly, to a method and apparatus for controlling an EDM process.

BACKGROUND OF THE INVENTION

Cavity-sinking or wire-EDM is now already state of the art with excellent surface quality of $R_a<0.1$ μm and at a material defect of the surface with a depth of less than 1 μm. Such machining requires generators that can generate monopolar or bipolar pulses in the megahertz range with current intensities around 1A This type of generator for ac pulses is disclosed in DE 40 11 752 A1. An oscillating resonance circuit at resonance gap widths to 20 pm and alternating current frequencies to 30 MHz is proposed with the purpose of permitting novel resonance machining during wire-EDM. However, an interfering self-control effect of the wire electrode has to be involved, which can cause errors in contour trueness on the order of the resonance gap width (20 μm). This effect is known to anyone skilled in EDM, who has already worked with finishing pulses at frequencies above 100 kHz. It is established that, despite trouble-free servocontrol and compensation of the contouring errors of the wire electrode, sharp external contours are rounded and inside corners have material excess. The more often such a fine cut is repeated, the poorer the precision. It is also found that the vertical profile becomes increasingly bulged, convexly bulged in the zones with material excess and concavely bulged in the zones with too much material removal.

It is also known that the electrical resistance of the spark gap in EDM during additionally generated periodic pauses can be determined by means of a measurement current source and the servodrive, rinsing device and generator controlled with it (CH 650 433). This process has the task of determining the degree of contamination, as well as the discharge concentration during cavity-sinkig EDM from the electrical resistance and controlling the process with reference to this value so that higher cutting performance is achieved during unsupervised operation.

In the interest of suppressing wire vibrations that can occur during EDM, it is known that such vibrations can be detected (JP 09248717 A, JP 63-216631, JP 63-22922). Lastly, Japanese Pat. Appi. No. 63-312020 discloses an EDM device wherein the vibration of the working electrode in the direction of machining a workpiece is detected. A machining gain is set in accordance with the amplitude of the vibration of the working electrode. The EDM operation can therefore be constantly performed with optimum machining gain in accordance with the change and fluctuation of the machining conditions.

SUMMARY OF THE INVENTION

In accordance with one aspect of the present invention, a process is useful for electrical discharge fine-machining of a workpiece with an electrode, where the electrode and the workpiece are at a fine-machining distance from one another and where smooth finishing pulses are applied to the workpiece in a controlled process. The machining is done intermittently, such that the smooth finishing pulses are applied at the gap during the processing times and the measuring source is applied at the gap at least during the interruption times. During the interruption times, it is determined with the aid of an electrical measurement if the electrode is in contact with the workpiece, and a pulse duty factor is obtained from this measurement, which determines the amount of contact. A control signal is derived from this for controlling the process.

In accordance with another aspect of the present invention, an electrical discharge machining method is useful in connection with a workpiece disposed at a fine-machining distance from an electrode to define a gap. The method includes the step of applying smooth finishing pulses to the gap intermittently such that each smooth finishing pulse is applied during a processing time and not during an interruption time in accordance with a control signal. Next, a determination is made with an electrical measurement at the gap during the interruption time as to whether the electrode is in contact with the workpiece. The method further includes the steps of obtaining a pulse duty factor therefrom and generating the control signal in accordance with the pulse duty factor.

In some embodiments, the determining step includes the step of recording oscillations of the electrode during a measurement time in accordance with a spark gap signal. The pulse duty factor may be defined as that part of the measurement time during which the electrode is in contact with the workpiece. The measurement time may be synchronized with the interruption time such that the measurement time begins after a delay from an onset of the interruption time.

In some embodiments, the generating step includes the steps of generating a first guide quantity in a measurement module from the pulse duty factor and controlling an advance system via providing a first reference signal to a servocontroller. If the pulse duty factor is higher than the first reference value, an advance speed of the advance system is reduced. If the pulse duty factor is lower than the first reference value, the advance speed is increased. A second guide quantity may be generated in the measurement module from the pulse duty factor and the duration of the processing time may be determined from a second reference value. If the pulse duty factor is lower than the second reference value, the duration of the processing time is reduced. If the pulse duty factor is greater than the second reference value, the duration of the processing time is increased.

In accordance with yet another aspect of the present invention, an apparatus is useful for electrical discharge machining of a workpiece disposed at a fine-machining distance from an electrode to define a gap. The apparatus includes a measurement module that develops a pulse duty factor from an electrical measurement regarding whether the electrode is in contact with the workpiece. The apparatus further includes a controller responsive to the pulse duty factor to establish a processing time during which smooth finishing pulses are applied to the gap and an interruption time during which the smooth finishing pulses are not applied to the gap. The electrical measurement occurs during the interruption time.

In some embodiments, the apparatus includes a generator that produces the smooth finishing pulses and a measurement source that produces a measuring voltage during the interruption time. The measurement module may determine the pulse duty factor from electrode oscillations during a measurement time, and may develop from the pulse duty factor first and second guide quantities to control an advance system and to control the duration of the processing time, respectively. The pulse duty factor is preferably representative of that part of the measurement time during which the electrode is in contact with the workpiece. In some other embodiments, the measurement source provides a current source characteristic with adjustable voltage limitation and pulse interruption capabilities. The measurement module may include a comparator that receives a spark gap signal and an adjustable limiting value to develop via a switching device and a low-pass filter an average value during the measurement time. The generator may include a class C amplifier having a modulation input terminal for receiving a machining time signal to establish a modulation gap of the amplifier at 100%. The generator may also include a pair of switching elements disposed in a half-bridge configuration and a pair of antiparallel diodes. The switching elements may be shifted into a nonconducting state in accordance with the machining time signal.

In some embodiments, the generator includes a series output wiring having an adjustable load resistance, an adjustable inductance, and an adjustable capacitance. At least one of these adjustable elements may be adjusted so that a resonance frequency of the series output wiring matches an operating frequency of the generator. Alternatively, at least one of the adjustable elements is adjusted so that the resonance frequency of the series output wiring is a multiple of the operating frequency of the generator. In yet another alternative embodiment, the adjustable inductance is adjusted to about zero and the adjustable resistance and capacitance are adjusted so that a time constant of the series output wiring is greater than the duration of a single pulse of the generator.

Additional advantages of the invention and its embodiments follow from the subsequent description of preferred practical examples and the accompanying schematic drawing.

DESCRIPTION OF THE PREFERRED EMBODIMENTS

The disclosed apparatus are advantageous in that the interfering self-control effect of the electrode at pulse frequencies above about 100 kHz is overcome by interrupting machining cyclically and recording and stabilizing the oscillation state of the electrode, for example, via the pulse duty factor. Because of this intermittent method of operation, the machining process is controllable in the micrometer range. Fine wire and sinking electrodes that are particularly vulnerable to this interfering self-control effect can be maximally loaded without compromising precision. Further, EDM processes with large-area sinking electrodes can be conducted more efficiently and precisely with this significant process signal. Another advantage is that the process values, i.e., all of the adjustment parameters for a specific job, can be determined in a much shorter time, since numerous interdependencies need no longer be considered.

Moreover, the additional investment in comparison with the benefits is limited and it is even possible to retrofit already existing installations to operate in accordance with the teachings of the present invention.

Figure 3A:
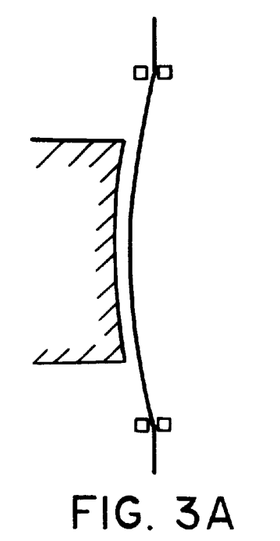
FIGS. 3a–3c show three different situations during fine cutting with a wire cutting machine according to the prior art.
Figure 3B:
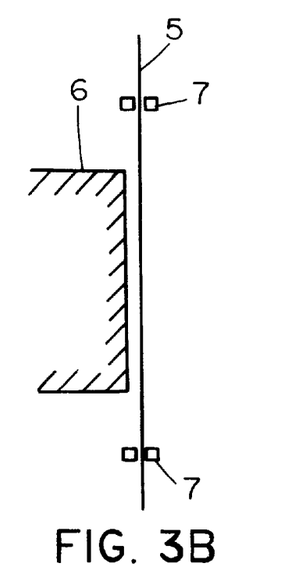
Figure 3C:
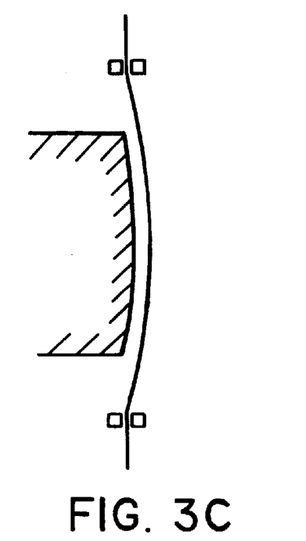

The interfering self-control effect during fine cutting with a wire cutting machine according to the prior art is first explained with reference to FIG. 3. Three scenarios a, b, c are shown in vertical section through an electrode 5, a workpiece 6, and an upper and lower guide head 7. The comments similarly apply to electrical discharge drilling, contour sinking and machining with sinking electrodes during use of pulse frequencies above about 100 kHz. It should be understood that the terms "worling electrode" and "electrode" as used herein encompass both wire and sinking electrodes.

It is assumed, for purposes of example, that the workpiece 6 has been precut once or several times, and is to be provided by a finishing apparatus with a required surface quality of $R_a=0.1$ μm. The workpiece 6 and the electrode 5 are disposed opposite each other at a very limited spacing, which is referred to as the fine machining spacing. This spacing defines a working gap between the electrode 5 and the workpiece 6. Machining of the surface of the workpiece 6 occurs in the working gap via so-called finishing pulses. For want of significant input quantities, the contour of the workpiece 6 is ordinarily traced with a constant servospeed.

Scenario a shows machining of an outside corner of the workpiece 6, or of a zone where errors in the form of unduly large material removal were caused with the precuts. It is interesting to note that EDM is not interrupted in such zones as a result of an open current, but rather maintained with high stability. From the concave, bulged vertical profile, one would also suspect that the working electrode 5 would execute a known barrel-shaped oscillation owing to increased electrostatic forces, ie., an oscillation in which the working electrode 5 is deflected symmetrically in all possible directions from the longitudinal axis, like a vibrating spring of a musical instrument. However, this is not the case, because, in the first place, instabilities of EDM would have to be established in the oscillation frequency of the wire electrode 5 and, in the second place, it could be perfectly demonstrated with optical wire position sensors according to DE 28 26 270 A1 that the wire electrode 5 is deflected completely smoothly to 15 μm against the workpiece 6. Wire oscillations of the known type could never be measured above 2 μm.

Scenario b shows machining on one line of the contour, where the precuts have left behind no errors. Only in this case does a process according to the prior art provide acceptable results for accuracy.

Finally, scenario c shows machining of an inside corner of the contour, or of sites where too much material was left on the workpiece 6 as a result of errors of the precuts. Here, the electrode 5 is deflected to about 10 μm from the workpiece. Ordinary servosystems would further increase (instead of reduce) the advance speed relative to the line contour, because, despite the material excess, a slightly greater open circuit fraction of the pulse is found (instead of, as expected, an increased short circuit fraction). This would further intensify the error.

In all three scenarios, stable electrical discharge machining prevails and no information can be gained in order to counteract the increasingly larger errors.

This unexpected behavior can only be explained by a self-control effect of the electrode 5. If we recall that the electrostatic forces on the wire electrode 5 increase in inverse proportion to the spark gap and that they disappear immediately at a spark gap equal to 0, the mechanism of scenario a immediately becomes clear. Namely, if we extrapolate larger, measurable spark gaps for fine machining, we arrive at 1 to 2 $\mu$m and not 20 $\mu$m, as was assumed in DE 40 11 752 A1. Because of the enormous electrostatic forces, the wire electrode 5 is pulled over the entire height of the workpiece 6 toward the workpiece 6 up to an ideal spark gap where erosion sets in and even generates counterforces. On the other hand, in scenario c the repelling erosion forces of the spark discharges predominate (which are also present in scenario a, but are small relative to the attracting electrostatic forces). This is the only plausible explanation for the undesired self-control effect.

In accordance with the teachings of the present invention, the erosion pulses are cyclically interrupted and the working electrode 5 is allowed to cyclically scan during a measurement phase, as to how much material is actually to be removed. During the measurement phase, the applied voltage is considerably smaller than the voltage applied during machining. Therefore, during the measurement phase, the electrode 5 executes oscillations only in the microrange and smaller as a result of the much smaller deflection force. Scanning occurs during the measurement phase via the voltage between the electrode 5 and the workpiece 6. The undesired self-control effect is suppressed, inasmuch as the limited measurement current scarcely leads to erosion discharges. Thus, the repelling forces are reduced and the limited measurement voltage of typically 10 VDC generates much lower electrostatic forces. Further, because the electrostatic force is known to be quadratically dependent on low voltage, low voltages lead to very low forces.

Figure 4A:
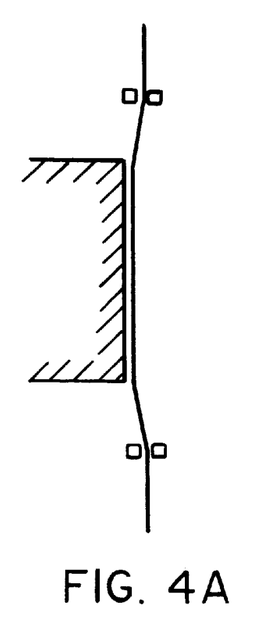
FIGS. 4a–4c show three different settings during fine cutting with a wire cutting machine constructed according to the teachings of the invention.
Figure 4B:
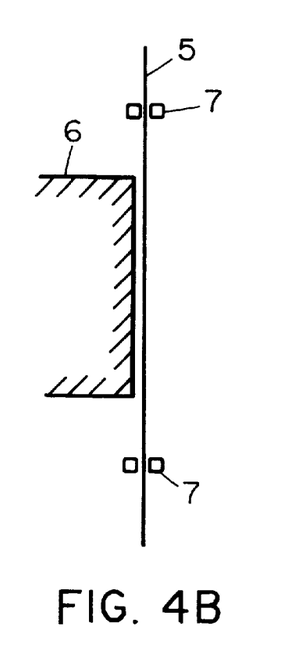
Figure 4C:
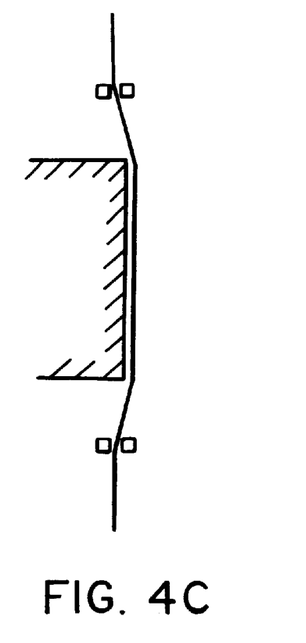

FIG. 4 shows the desirable results of EDM processing performed in accordance with the teachings of the invention. In contrast to FIG. 3, the outside corner, line and inside corner situations are not shown, but rather the last fine cut, which is run with three different pulse duty factors of the scanning signal. That is, reference values for the pulse duty factor are stipulated for the process in order to generate guide quantities SC for a servocontroller 8 FIG. 1) and a guide quantity GC for a controller or oscillator 1 (FIG. 1) from it and from the measured pulse duty factor. The pulse duty factor is preferably defined as that fraction of the measurement time during which the electrode 5 is in contact with the workpiece 6.

In FIG. 4a, a reference value of 10% is stipulated for the average pulse duty factor. In FIG. 4b, the reference value is 50%, and, in FIG. 4c, it is 90%. Experiments have shown that above this range any adjustment can be reproducibly applied and that the reproducible deflection, for example, at a workpiece height of 50 mm, is typically 1 $\mu$m toward the workpiece 6 in case a and 1 $\mu$m away from workpiece 6 in case c. This immediately suggests a great potential for high-precision machining in the submicrometer range. Interestingly, no bulginess recordable with ordinary means of measurement could be detected in either case a or case c. This would have to be due to the desired self-control effect, which in this region displaces the electrode 5 in a parallel fashion over the entire height of the workpiece.

Moreover, existing contour errors due to the precuts are eliminated and outside corners and inside corners of the contour are perfectly reproduced with errors of less than 1 $\mu$m.

Figure 1:
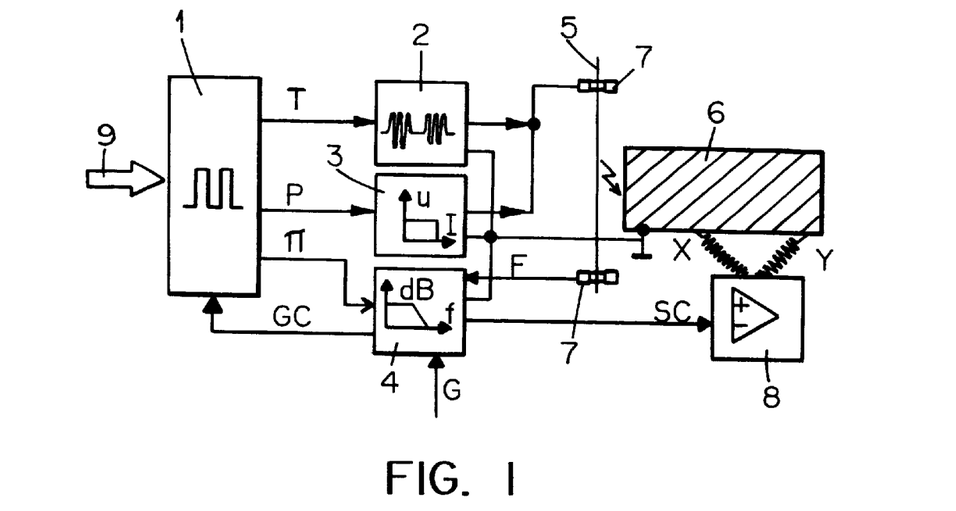
FIG. 1 is a schematic diagram of a wire cutting machine constructed in accordance with the teachings of the invention.

The basic concept for a wire cutting machine constructed in accordance with the teachings of the invention is shown in FIG. 1. However, the principle applies equally to electrical discharge cavity-sinling or drilling machines. The only difference concerns the servocontroller 8, which then generally acts only on a Z axis and a lower guide head 7, which is typically not present. The spark gap signal (F) as shown, can be taken on the lower guide head 7, but naturally also on the upper guide head 7 or directly from the electrode 5.

It will be understood by those skilled in the art that various components typically included in a wire cutting machine are not shown in FIG. 1, only because their inclusion is not essential for understanding the practice of the invention.

The controller 1, which may be an oscillator, receives adjustment values via a control connection 9 from a higher order control system (not shown) and sends a control signal T for cyclic intermittent activation of a generator 2 during a machining or processing time T. Another control signal P is fed to a measurement source 3 in order to activate this cyclically between the machining times T, i.e., during the interruption time P.

A third control signal M is sent from the oscillator 1 to a measurement module 4 to allow this to form an average value during measurement time M. The generator 2, the measurement source 3 and the measurement module 4 are directly connected via the upper and/or lower guide head 7 to the electrode 5, as well as to the workpiece 6. The servocontroller 8 executes the advance movements for an advance system having drive axes X, Y and/or additional drive axes Z, U, V, A, B, C, etc.

In a preferred embodiment, the generator 2 has a design as specified in detail in the Proceedings of the Power Conversion Conference of May 1996 in Nurnberg, Germany on pages 77 to 84, the disclosure of which is hereby incorporated by reference. This radio-frequency amplifier in the class D design has an efficiency greater than 84% at 1200 Watt output power. An operating frequency of more than 13 MHz may be modulated as desired via a modulation input J1 with a modulation depth of 100%. Therefore, the operating frequency may be released in packets during the machining or processing time T and blocked during an interruption time P. This amplifier may also be redimensioned very easily for smaller powers. For example, one possibility is to adjust the feed voltage (300 VDC) toward lower values, such as about 30 VDC.

The measurement source 3 serves to identify the electrode oscillations during the interruption time by measuring workpiece contact (short circuit) and noncontact (open circuit). Since a certain contamination of the dielectric is always present in the working gap (i.e., spark gap) even during fine machining and thus a certain conductance appears as interference signal, a current source characteristic is preferred for the measurement source 3. Further, the measurement source 3 preferably has voltage limitation as well. Thus, the current source can be adjusted so that a high conductance of the spark gap still does not cause voltage interruption of the measurement source 3. A simple voltage source with a load resistance would be much more sensitive to these disturbances because of the triangular IV characteristic. Preferably, the current source characteristic of the measurement source 3 is adjustable between 10 mA and 600 mA and the voltage limitation of the measurement source 3 is adjustable between 1 V and 100 V.

It may also be necessary or desirable to adjust the polarity of the measurement source 3 to the machining task or even change it in alternation. Thus, workpieces made of aluminum or titanium in a water dielectric have a tendency toward formation of an oxide layer under high negative electrode voltages, which adversely affects the measurement. A positive electrode voltage causes no problems of this type.

The measurement source 3 therefore has a switching element at the output that can conduct the measurement pulses during the interruption time P in both polarity directions and can also isolate the optionally bipolar voltage pulses of the generator 2 in both polarity directions. Known transistor-diode circuits (not shown) are appropriate for this, whether in a bridge arrangement, antiseries or antiparallel.

It should be understood that machining with interruption phases for measurement purposes does not necessarily lead to a power loss. The average power is decisive for loading the electrode 5 and the time loss can be compensated, for example, by increasing the current pulses of the generator 2. For example, during electrical discharge microdrilling with an electrode diameter of 200 $\mu$m in steel, electrical discharge machining (EDM) in accordance with the disclosed process resulted in a tripling of the drilling speed relative to a conventional EDM process. At the same time, the form trueness and reproducibility were significantly better.

In an alternative embodiment, the measurement module 4 in FIG. 1 may be continuously connected to the spark gap signal F. Its input need only have an appropriate voltage strength. However, in this case, the comparison result from the spark gap signal F and a limiting value G (further explained below) is evaluated only during measurement time M and averaged. This may be addressed with CMOS components and a low-pass filter. Since the pulse duty factor of the electrode oscillation, however, is a time-discrete average value, average value formation may be accomplished just as well purely digitally in the time window of measurement time M. For example, average value formation may be accomplished by counting clock pulses while the electrode 5 is in contact with the workpiece 6 in the measurement time-time window, or in other words, when the spark gap signal F lies below the limiting value G. Interpretation of the counter state then occurs after an established filter time.

Corresponding circuits are known to those skilled in the art from determining ignition delay times. See, for example, DE-OS 22 50 872.

The machining process is conducted based on a control (with a closed action loop). To this end, first and second reference values are stipulated for the measurement module 4 to generate the guide quantity SC for the servocontroller 8 and thus the advance speed, and the guide quantity GC for the oscillator 1 and thus the machining time T, in addition to the limiting value G. The two reference values determine the pulse duty factor for the process, i.e., what percentage of the measurement time M the electrode 5 is to be in contact on average with the workpiece 6. If the determined pulse duty factor exceeds the first or second reference value, the advance speed of the electrode 5 is reduced and the duration of the machining time T increased. The two reference values may be set equal, in which case the control interventions on the machining time T and the advance speed are added in their effect. With different reference values, the more insensitive control intervention executes its effect only when the more sensitive control intervention can no longer keep the pulse duty factor at its reference value owing to saturation or transient deviation. Stability criteria must naturally be considered, which, however are well known to those skilled in control technology. A definition for the pulse duty factor is only used as a reference point herein, such that 0% corresponds with a continuous open circuit and 100% corresponds with a continuous short circuit, i.e., contact between the electrode 5 and the workpiece 6. It is clear that this definition may also be inverted.

Figure 2:
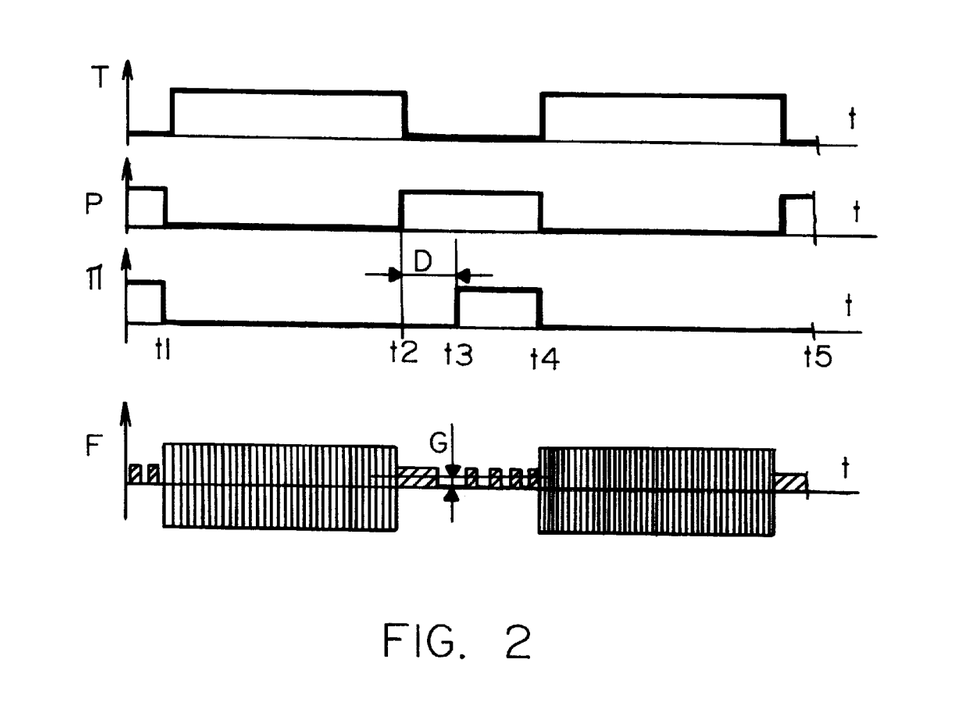
FIG. 2 is a timing diagram of signals utilized by the wire cutting machine of FIG. 1.

FIG. 2 schematically depicts the time trend of the following signals: a machine time T, an interruption time P, a measurement phase M and a spark gap signal F. The machining time is from t1 to t2 and t4 to t5, which may be shortened via the second control quantity GC. During this time, the generator 2 is engaged and the measurement source 3 disconnected.

The interruption time T is from t2 to t4, which may last about 200 $\mu$s, during which the generator 2 is disconnected. During a delay time D within the interruption time P, the electrode 5 has time to oscillate into the oscillation state stipulated by the measurement source 3. In a typical case, the interruption time may be about 1 ms and the delay time may be about 200 $\mu$s. Since, due to the smaller measurement voltage, the electrostatic forces are much smaller in this case, the oscillation width also becomes much smaller. The measurement phase or time M is between t3 and t4, where it is evaluated what percentage of the measurement time M the spark gap signal F lies below the limiting value G. The limiting value G is set at roughly half the voltage of the measurement source 3. During this time, regular oscillations are established in the range of a few kHz. This frequency is dependent on the weight and elasticity of the electrode 5. Contrary to suspicions, large-area sinking electrodes also oscillate during fine-machining conditions. Even complex oscillation modes occur here as a result of bending, shear and torsional forces. Thus far, the symmetric blackening patterns of the electrodes have been attributed to different rinsing conditions, but experiments have now shown that during use of the disclosed process these blackening patterns disappear. This is certainly an indication that these oscillations can now be controlled in the microrange. The machining times in these experiments were also significantly shorter than with traditional methods.

In an alternative embodiment, the delay time D from t2 to t3 may also be dispensed with such that the measurement time M begins immediately after the machining time. The measurement time then lasts typically 200 $\mu$s and is as long as the interruption time P. The information then appears in a slightly altered forn, but may be evaluated in precisely the same way. On average, the voltage during the measurement time M now lies above the limiting value G longer, the further the electrode is removed from the workpiece. This type of measurement may be of interest if one desires higher cuing powers at more modest precision.

Figure 5:
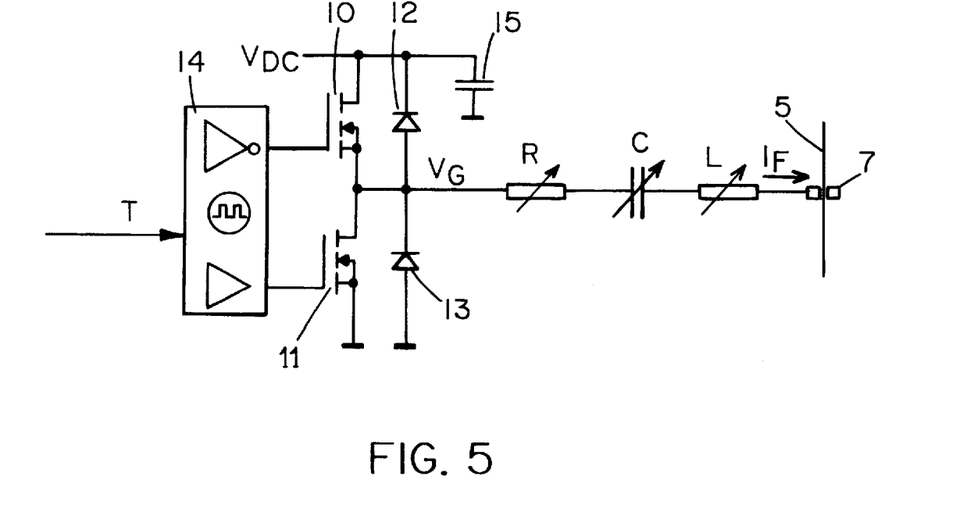
FIG. 5 is a schematic diagram of a generator constructed according to the teachings of the invention.

FIG. 5 shows an advantageous embodiment of the generator 2 that utilizes a half-bridge technique. Two semiconductor switches 10, 11, each of which may for example, comprise a MOSFET device, are supplied with control pulses of opposite phase from a control circuit 14. The control circuit 14 has an adjustable oscillator and also receives the machining time signal T to block the semiconductor switches 10, 11 outside of the machining time T. Antiparallel diodes 12, 13 protect the semiconductor switches 10, 11 during incorrect adjustment of series output wiring R, C, L against overvoltage and inverse operation.

Figure 6:
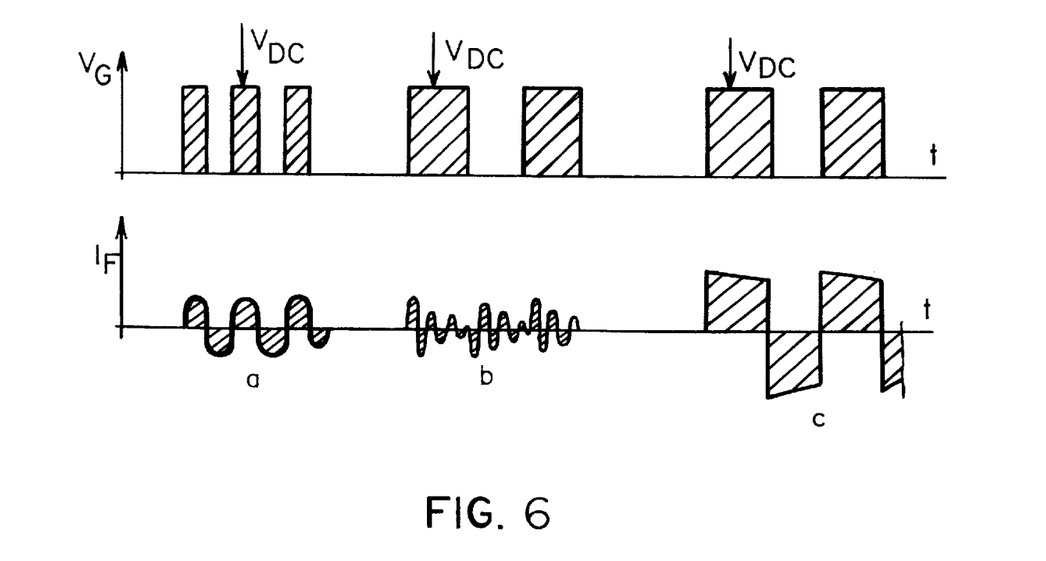
FIGS. 6a–6c are time plots of the generator voltage $V_G$ and the spark gap current $I_F$ during three different types of operation of the generator of FIG. 5.

FIG. 6 shows three different types of operation of the generator 2 according to FIG. 5, which are produced merely by corresponding adjustment of the series output wiring R, C, L. The upper curve shows the generator voltage $V_G$ at the center point of the bridge. A rectangular oscillation develops there with the amplitude of the adjustable feed voltage $V_{DC}$, which is buffered by capacitor 15. The duration of the rectangular oscillations is dependent on the adjustment of the oscillator in the control circuit 14. The lower curve shows the spark gap current $I_F$ as it is delivered via the guide head 7 to the electrode 5 with the spark gap ignited. The workpiece 6 is then connected at the steady ground potential of the feed voltage $V_{DC}$.

Case a shows ideal adjustment of the series output wiring R, C, L, in which the resonance frequency of the oscillation circuit, formed from the capacitor C and the inductance L, corresponds precisely to the oscillation frequency of the generator voltage $V_G$. The load resistance R may then be short-circuited, and if not, will only cause a reduction of current amplitude. The inductance L may merely consist, if necessary, of the leakage inductance of the discharge circuit. It should be mentioned here that a class D radio frequency amplifier operates only in this manner according to case a.

Case b shows a crude error adjustment in which the oscillation circuit formed from the capacitance C and the inductance L is set at a higher resonance frequency that may be, for example, six times higher than the frequency set in the oscillator of the control circuit 14. To avoid counterphase situations between the generator voltage $V_G$ and the spark gap current $I_F$, the load resistance R can be adjusted so that the current amplitudes decay essentially according to the duration of a single generator pulse $V_G$. It is then possible with comparatively simple means to generate discharge frequencies up to about 25 MEz. The forward oscillation amplitude of the spark gap current $I_F$ is fed via the antiparallel diodes 12, 13 to the capacitor 15 where the energy is temporarily stored.

Case c shows a third type of operation in which the inductance L is set as close as possible to zero and a time constant is formed (from the load resistance R and the capacitance C) that is larger than the pulse width of the generator voltage $V_G$. The amplitude of the spark gap current $I_F$ can be determined over broad limits by the adjustable feed voltage $V_{DC}$ and through adjustment of the load resistance R Bemuse the capacitor C is always connected in series, a DC component of the spark gap current $I_F$ is effectively suppressed. These explanations demonstrate the advantages and the numerous adjustment possibilities of this embodiment of the generator 2.

Although certain instantiations of the teachings of the invention have been described herein, the scope of the coverage of this patent is not limited thereto. On the contrary, this patent covers all instantiations of the teachings of the invention fairy falling within the scope of the appended claims either literally or under the doctrine of equivalents.

What is claimed is:

1. Process for the electrical discharge fine-machining of a workpiece with the aid of an electrode, where the electrode and the workpiece are at a fine-machining distance to one another thereby forming a gap and smooth finishing pulses are applied to the workpiece in a controlled process, characterized by the fact that that the machining is done intermittently, where the smooth finishing pulses are applied to the gap during a processing time (T) and a measuring source is applied at the gap at least during an interruption time (P), and that during the interruption time (P) it is determined during a measurement time (M) with the aid of an electrical measurement if the electrode is in contact with the workpiece, and that a pulse duty factor is obtained from the measurement, and that a control signal is derived from the measurement for controlling the process.

2. Process according to claim 1, characterized by the fact that a delay time (D) is zero and the measurement time (M) equals the interruption time (P).

3. Process according to claim 1, wherein the pulse duty factor is representative of a portion of the measurement time (M) during which the electrode is in contact with the workpiece.

4. Process according to claim 1, characterized by the fact that the measurement time (M) is synchronized with the interruption time (P), but a beginning of the measurement time (M) is delayed by a delay time (D).

5. Process according to claim 1, characterized by the fact that a first guide value generated in a measurement module from the pulse duty factor and a first reference value is fed to a servoregulator in order to control an advance system.

6. Process according to claim 5, characterized by the fact that if the pulse duty factor exceeds the first reference value, the advance speed is reduced and, if the pulse duty factor lies lower than the first reference value, the advance speed is increased.

7. Process according to claim 1, characterized by the fact that a second guide value generated in a measurement module from the pulse duty factor and a second reference value controls the duration of the processing time (T).

8. Process according to claim 7, characterized by the fact that, if the pulse duty factor lies lower than the second reference value, the duration of the processing time (T) is reduced.

9. Process according to claim 7, characterized by the fact that the processing time (T), without control intervention, is 30 ms, and is reduced linearly with a decreasing pulse duty factor through the second guide value towards zero at a pulse duty factor of 0%.

10. Process according to claim 9, characterized by the fact that the interruption time (P) is 1 ms and a delay time (D) within the interruption time and prior to the measurement time is 200 $\mu$s.

11. Process according to claim 7, characterized by the fact that, if the pulse duty factor lies higher than the second reference value, the duration of the processing time (T) is increased.

12. Process according to claim 1, characterized by the fact that the polarity of the output signal of the measuring source is set positive or negative or alternating positive and negative from interruption time (P) to interruption time (P).

13. Process according to claim 1, characterized by the fact that the interruption time (P) is 200 $\mu$s.

14. Process according to claim 1, characterized by the fact that a generator generates bipolar or monopolar pulses with a pulse duration lying between 10 $\mu$s and 20 ns, a current amplitude between 10 A and 500 mA and a pulse frequency between 100 kHz and 25 MHZ and the generator has an activation input in order to receive a processing time signal and to generate the pulses only during the processing time (T).

15. Process according to claim 1, characterized by the fact that the measuring source applied at the gap during the interruption time (P) has a current source characteristic with voltage limitation.

16. Process according to claim 9, characterized by the fact that the current source characteristic of the measuring source is adjustable between 10 mA and 600 mA and the voltage limitation of the measuring source is adjustable between 1 V and 100 V.

17. Process according to claim 9, characterized by the fact that a signal representing the pulse duty factor during the measurement time (M) is compared in a measuring module with an adjustable limiting value, in which the adjustable limiting value is smaller than the voltage limitation of the measuring source and a comparison result is fed during the measurement time (M) to a filter, in which an averaged pulse duty factor is kept unchanged between the measurement time (M) and a subsequent measurement time (M) in the filter.

18. Apparatus for electrical discharge fine-machining of a workpiece, comprising:
   an electrode, where the electrode and the workpiece are at a fine-machining distance from one another thereby forming a gap;
   a generator that applies smooth finishing pulses to the workpiece in a control process, characterized by the fact that the smooth finishing pulses are applied intermittently, such that the smooth finishing pulses are applied to the gap during a processing time;
   a measuring source applied at the gap at least during an interruption time (P), such that during the interruption time (P) it is determined during a measurement time (M) with the aid of an electrical measurement if the electrode is in contact with the workpiece; and
   a measurement module that determines a pulse duty factor from the measurement and derives a control signal from the measurement for controlling the process.

19. Apparatus according to claim 17, characterized by the fact that
   a generator is provided, which produces the smooth finishing pulses cyclically only during a processing time (T),
   a measuring source produces the measuring pulses during the interruption time (P) depending on an interruption time signal,
   a measurement module is provided, which determines the pulse duty factor of oscillations of the electrode during a measurement time (M) from a signal representing the pulse duty factor and
   the measurement module has at least one of a first guide value output and a second guide value output in order to control at least one of an advance system as a function of the pulse duty factor and the duration of the processing time (T).

20. Apparatus according to claim 18, characterized by the fact that at least one of the generator, the measuring source and the measurement module have an activation input with which their activation is controllable.

21. Apparatus according to claim 18, characterized by the fact that the measuring source consists of an adjustable current source the output of which is provided with an adjustable voltage limitation circuit and a pulse interruption circuit.

22. Apparatus according to claim 21, characterized by the fact that the output of the adjustable current source is provided with a polarity inverter.

23. Apparatus according to claim 18, characterized by the fact that the generator consists of a class C amplifier, in which a modulation input is provided to receive a signal representing processing time (T) and that a modulation gap of the amplifier is then 100%.

24. Apparatus according to claim 18, characterized by the fact that the generator consists of at least two switching elements in a half-bridge circuit and antiparallel diodes, in which the switching elements are shifted into a nonconducting state via a blocking input with reference to a signal representing the processing time (T).

25. Apparatus according to claim 18, charactried by the fact that the generator contains a series output wiring which has one or more of the following elements:
   an adjustable load resistance
   an adjustable inductance
   an adjustable capacitance.

26. Apparatus according to claim 25, characterized by the fact that one or more of the adjustable load resistance, the adjustable inductance, and the adjustable capacitance, is adjusted so that the resonance frequency formed by the adjustable inductance and the adjustable capacitance lies at the operating frequency of the generator.

27. Apparatus according to claim 25, characterized by the fact that one or more of the adjustable load resistance, the adjustable inductance, and the adjustable capacitance, is adjusted so that the resonance frequency formed by the adjustable inductance and the adjustable capacitance is a multiple of the operating frequency of the generator and the adjustable load resistance is adjusted so that the resonance oscillation essentially decays during one individual pulse of the generator.

28. Apparatus according to claim 25, characterized by the fact that the adjustable inductance is set at zero and the adjustable capacitance and the adjustable load resistance are adjusted so that their time constants are greater than the duration of a single pulse of the generator.

29. Apparatus according to claim 18, characterized by the fact that the measurement module contains a comparator, which receives the signal representing the pulse duty factor and an adjustable limiting value and the output of the comparator is fed via a switching device to a low-pass filter to form an average value during the measurement time (M), in which during the measurement time (M) the switching device is in a conducting state and between the measurement time (M) and a subsequent measurement time (M), the switching device is in an isolated state.

30. Apparatus according to claim 17, wherein the pulse duty factor is representative of a portion of the measurement time (M) during which the electrode is in contact with the workpiece.

31. For use with a workpiece disposed at a fine-machining distance from an electrode to define a gap, an electrical discharge machining method comprising the steps of:
   applying smooth finishing pulses to the gap intermittently such that each smooth finishing pulse is applied during a processing time and not during an interruption time in accordance with a control signal;
   determining with an electrical measurement at the gap during the interruption time whether the electrode is in contact with the workpiece;
   obtaining a pulse duty factor from the electrical measurement wherein the pulse duty factor determines an amount of contact between the electrode and the workpiece; and
   generating the control signal in accordance with the pulse duty factor.

32. An electrical discharge machining method as defined in claim 31 wherein the determining step comprises the step of recording oscillations of the electrode during a measurement time in accordance with a spark gap signal.

33. An electrical discharge machining method as defined in claim 30 wherein the determining step comprises the step of comparing a spark gap signal in a measurement module with an adjustable limiting value that is lower than the voltage limitation of the measurement source and wherein the obtaining step comprises the step of maintaining the pulse duty factor between measurement times (M).

34. An electrical discharge machining method as defined in claim 30 wherein the generating step comprises the steps of:

generating a first guide value in a measurement module from the pulse duty factor; and controlling an advance system via providing a first reference signal to a servocontroller.

35. An electrical discharge machining method as defined in claim 30 wherein the generating step further comprises the steps of:

generating a second guide value in the measurement module from the pulse duty factor; and determining the duration of the processing time from a second reference value.

36. For use with a workpiece disposed at a fine-machining distance from an electrode to define a gap, an apparatus for electrical discharge machining of the workpiece comprising:

a measurement module that develops a pulse duty factor from an electrical measurement regarding whether the electrode is in contact with the workpiece, the pulse duty factor determining an amount of contact between the electrode and the workpiece; and a controller responsive to the pulse duty factor to establish a processing time during which smooth finishing pulses are applied to the gap and an interruption time (P) during which the smooth finishing pulses are not applied to the gap, the controller cooperating with the measurement module such that the electrical measurement occurs during the interruption time (P).

37. An apparatus as defined in claim 34 further comprising:

a generator that produces the smooth finishing pulses; and a measurement source that produces a measuring voltage during the interruption time, the measurement module determining the pulse duty factor from electrode oscillations during a measurement time, and the measurement module developing from the pulse duty factor a first guide quantity and a second guide quantity to control an advance system and to control the duration of the processing time, respectively.

38. An apparatus as defined in claim 37 wherein the measurement module comprises a comparator that receives a spark gap signal and an adjustable limiting value to develop via a switching device and a low-pass filter an average value during the measurement time.

* * * * *